Dec. 1, 1953

L. H. KAUPKE 2,660,938

TOOL BAR FOR CRAWLER TRACTORS

Filed June 23, 1949

Inventor
Lee H. Kaupke
Paul O. Pippel
Atty

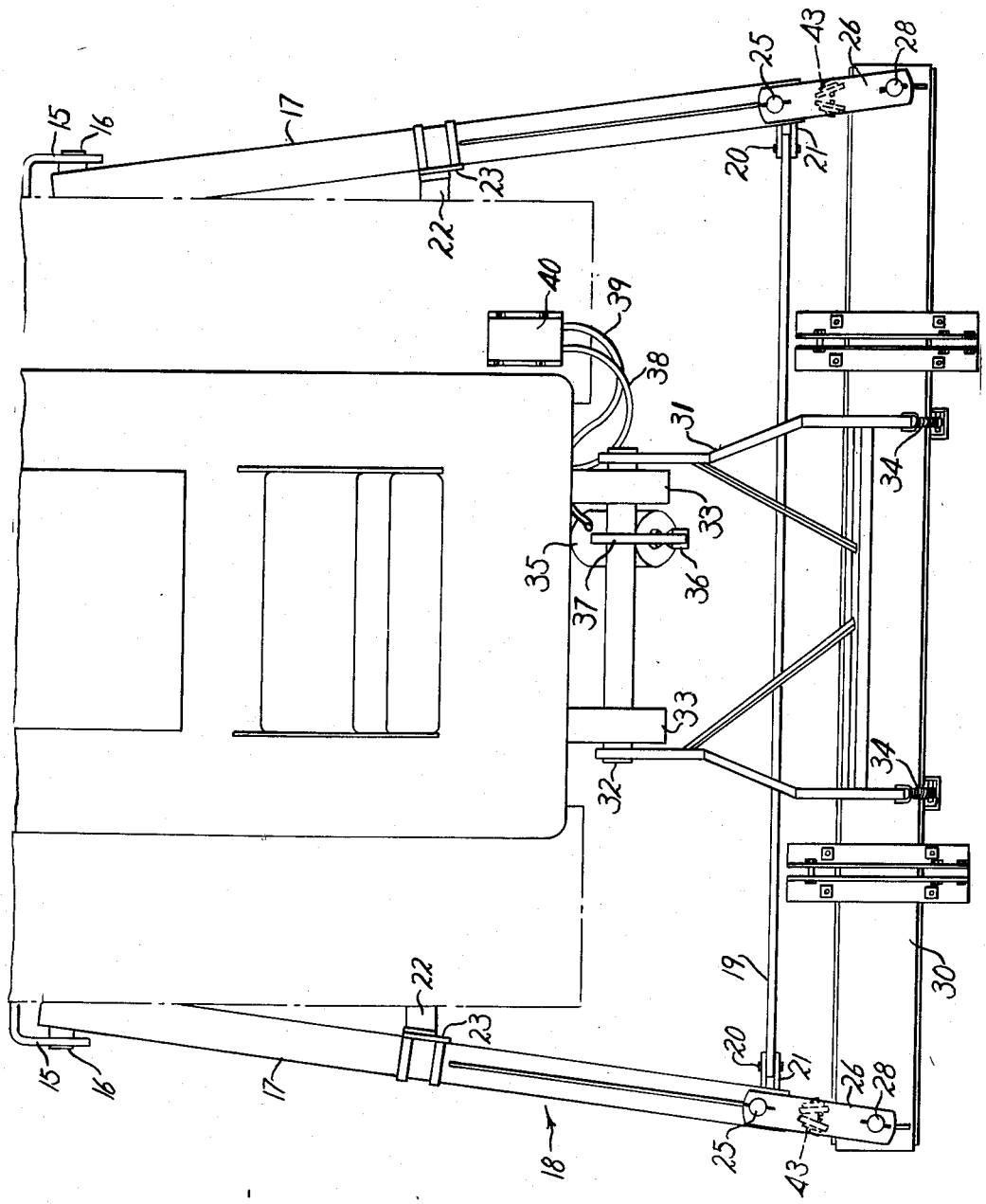

Dec. 1, 1953  L. H. KAUPKE  2,660,938
TOOL BAR FOR CRAWLER TRACTORS
Filed June 23, 1949  4 Sheets-Sheet 3
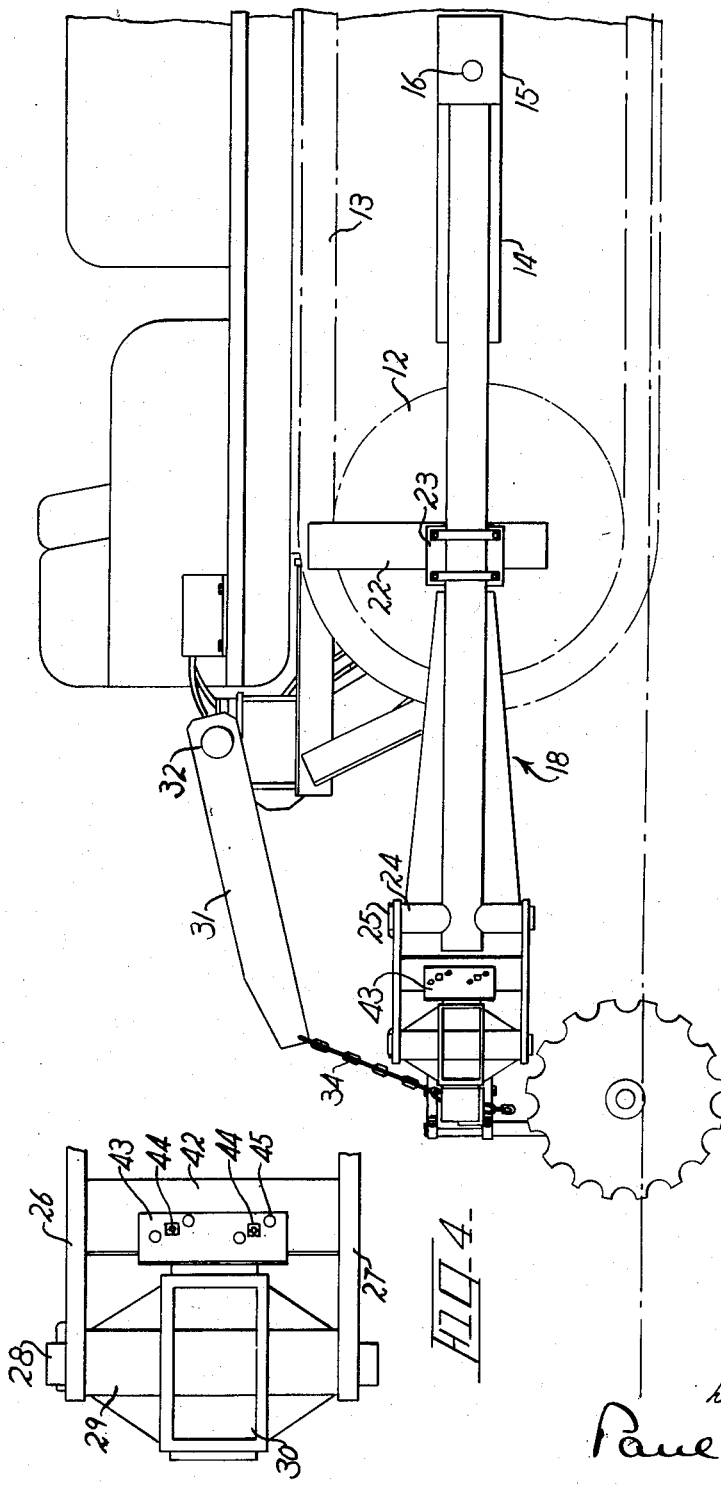
Inventor
Lee H. Kaupke Dec. 1, 1953  L. H. KAUPKE  2,660,938
TOOL BAR FOR CRAWLER TRACTORS
Filed June 23, 1949  4 Sheets-Sheet 4
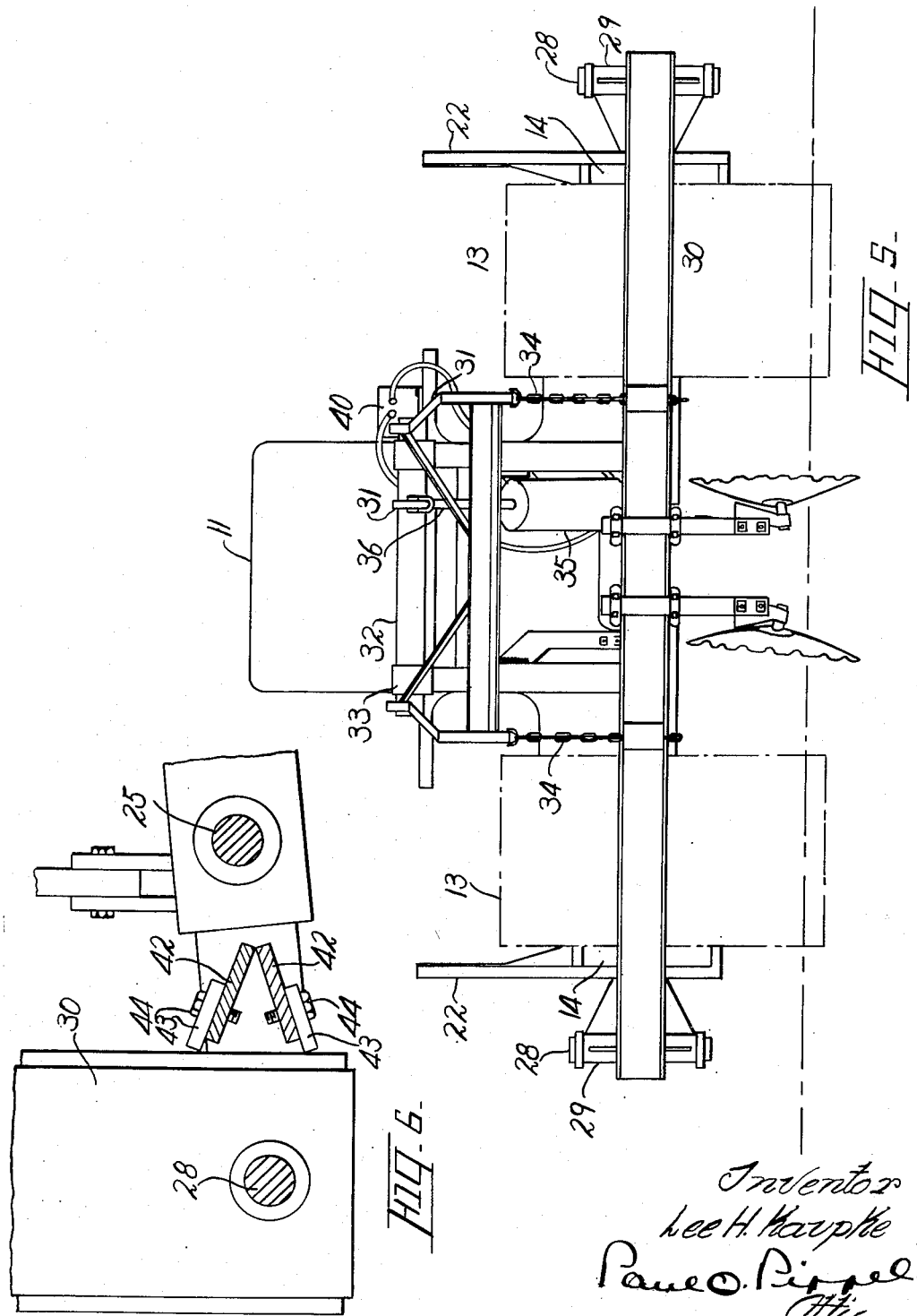
Inventor
Lee H. Kaupke
Paul O. Pippel
Atty Patented Dec. 1, 1953

2,660,938

UNITED STATES PATENT OFFICE 2,660,938

TOOL-BAR FOR CRAWLER TRACTORS

Lee H. Kaupke, Stockton, Calif., assignor to International Harvester Company, a corporation of New Jersey Application June 23, 1949, Serial No. 100,777

6 Claims. (Cl. 97—47.16)

1

This invention relates to agricultural implements, and particularly to tractor-mounted implements. More specifically, the invention concerns a tool-bar construction for attaching implements to a tractor of the crawler or track-laying type.

In mounting implements upon crawler tractors difficulties have been experienced with earth-working tools being unable to follow in the path of the tractor as it is steered, the result being that an earth-penetrating implement is frequently damaged. It is especially important in this type of tractor that certain implements be able to follow the tractor without being subjected to the jerky movements participated in by the tractor incident to the steering thereof. In certain types of implements such as a sub-soil cultivating tool it is important that the tool be able to move laterally relative to the tractor. If such a tool were held rigid with the tractor it might be damaged, but another result is that the locked tool acts as a rudder and makes it impossible to properly steer the tractor. It is therefore essential that the tool-bar carrying such a tool should be allowed to move laterally when the tractor is steered.

In another type of implement such as rolling disks utilized in cane cultivation it is desirable that the tool be held rigid with the tractor so that better control of the tool can be obtained.

It is therefore an important object of the present invention to provide a novel attaching structure for use in mounting earth-working tools of different operating characteristics upon a tractor of the crawler or track-laying type.

Another object of the invention is to provide, in a tool-bar attaching structure for mounting earth-working tools upon a tractor, optionally operable means for locking the tools against lateral movement or for permitting movement thereof relative to the tractor.

Another object of the invention is to provide in a tool-carrying bar or frame connected to the tractor by pivoted links accommodating lateral movement of the bar, adjustable stops carried by the links movable to positions in and out of engagement with the tool-bar to render the pivotal connections thereof ineffective.

Other objects and advantages of the invention will become clear from the following detailed description when read in conjunction with the accompanying drawings, wherein:

Fig. 2 is a plan view of the structure shown in Fig. 1.

Fig. 3 is a side elevation similar to Fig. 1 and showing a portion of an earth-working tool in the form of cane cultivating disks mounted upon the implement attaching structure.

Fig. 4 is an enlarged detail of a portion of Fig. 3 showing the locking or stop mechanism in position to hold the tool-bar against lateral swinging movement.

Fig. 5 is a rear elevation of the structure shown in Fig. 3.

Fig. 6 is a view partly in section of a portion of the attaching structure shown in Fig. 1 with the tool-bar locks or stops engaging the tool-bar.

Figure 1:
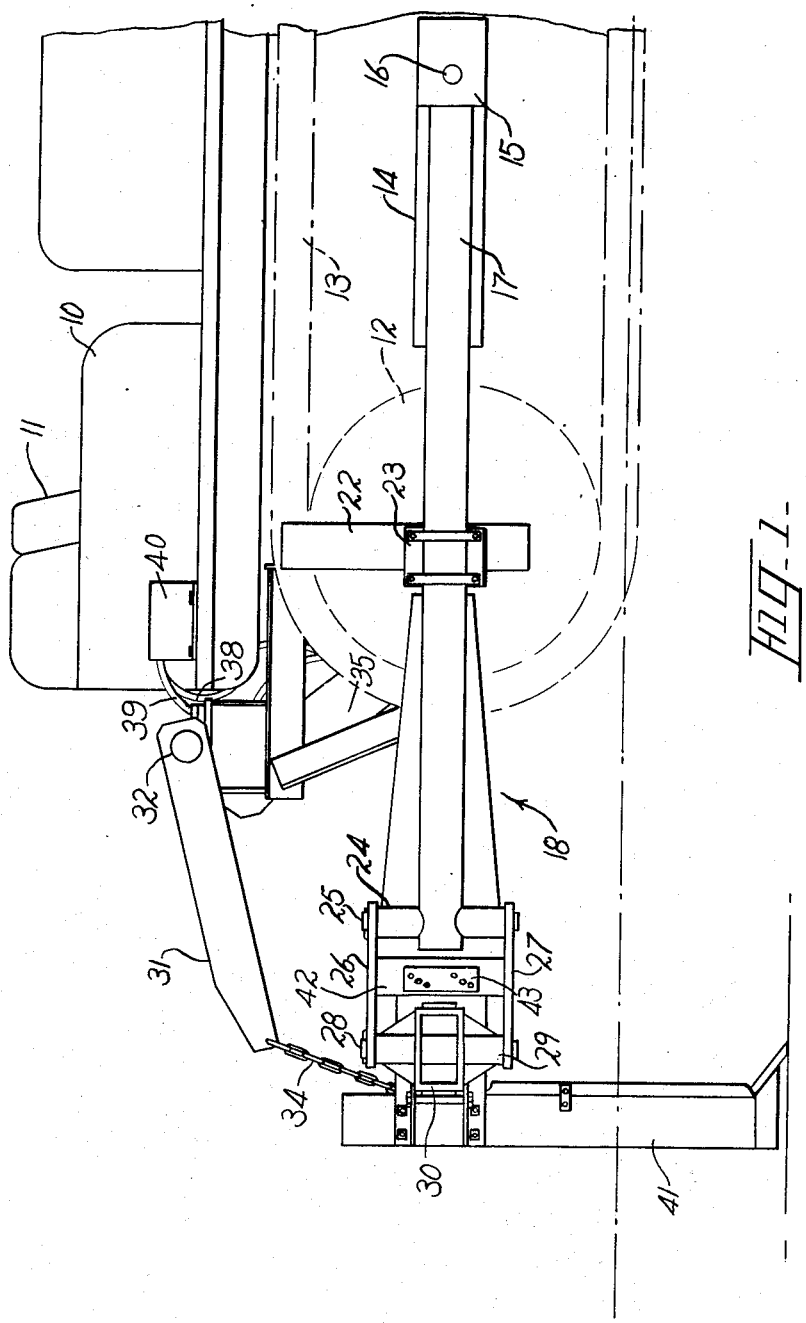
Fig. 1 is a view in side elevation of a crawler tractor having mounted thereupon an implement attaching structure embodying the features of the present invention and wherein the implement is a sub-soiler.

Referring now to the drawings, numeral 10 designates a tractor of the track-laying or crawler type having an operator's station 11, track frames 12 and endless tracks 13. Secured to the track frame 12 at each side of the tractor is a bracket 14 having a bent portion 15 supporting a transversely extending pivot pin 16 upon which is pivotally mounted the forward end of one arm 17 of a draft frame generally indicated at 18. An arm 17 is provided at each side of the tractor and these arms diverge to a location rearwardly of the tractor and are connected by a cross-piece 19 pivoted at opposite ends upon pins 20 mounted in lugs 21 secured to the rear ends of the pipes or draft arms 17. The draft frame represented by the laterally spaced draft arms 17 is thus connected to the tractor for vertical swinging movement about the pivot pins 16 with respect to the tractor. Likewise secured to the track frame 12 at each side of the tractor is a vertically extending guide member 22 which engages the flat face of a clamp 23 secured to the arm 17. As shown particularly well in Fig. 2, clamp 23 engages the guide member 22 to prevent lateral swinging of the draft frame 18 and to confine the arms 17 and guide them in their vertical swinging movement.

The rear end of each of the arms 17 is provided with a bearing portion 24 which serves for the pivotal mounting therein of a vertically extending pivot pin 25. Each pin 25 has pivotally mounted upon opposite ends thereof the forward ends of vertically spaced parallel links 26 and 27. The rear ends of links 26 and 27 are pivotally mounted in a similar manner upon opposite ends of a vertically extending pin 28 mounted in a bearing 29 carried at each end of a transversely extending rectangularly shaped tool-bar 30. Tool-bar 30 is thus supported at the rear end of the arms 17 and is capable of lateral swinging movement with respect to the draft frame 18 and with respect to the tractor.

Raising and lowering of the draft frame 18 and tool-bar 30 to move the earth-working tools between operating and transport positions is accomplished by lifting mechanism including a bail member 31 mounted upon opposite ends of a transversely extending rock shaft 32 rockably supported by brackets 33 secured to the tractor body. The rearwardly extending end of the bail member 31 is connected by laterally spaced flexible chains 34 to the tool-bar 30. Vertical movement of the bail 31 to raise and lower the tool attaching structure is accomplished by a hydraulic ram unit comprising a cylinder 35 and a piston rod 36. The cylinder 35 is suitably anchored to the tractor body and the piston rod 36 is pivotally connected to a rock arm 37 affixed to the transverse shaft 32. Fluid under pressure for operating the ram unit is supplied through hose lines 38 and 39 from a source indicated at 40 upon the tractor.

As pointed out before, it is important in a tractor of this type provided with an attaching mechanism upon which may be mounted earth-working tools having different operating characteristics that adequate control of the working tool be provided. The sub-soil cultivator shown in Fig. 1 digs deeply into the soil and acts as a rudder to interfere with the steering motion of the tractor. Furthermore, such an implement is subjected to considerable strain if it is rigidly mounted with respect to the tractor. It is therefore necessary that, when such a tool as the sub-soil cultivator 41 is mounted upon the tool-bar the parallel links 26 and 27 be permitted to turn about their pivots so that the tool-bar 30 and the tool 41 may be able to move laterally with respect to the tractor. It is also important for accurate control of such an implement as cane disks shown in Fig. 3 that the tool-bar be held rigidly with the draft frame 18 and that it not be allowed to swing from one side to the other with respect to the draft frame.

In order to provide for the aforesaid contingencies, applicant has provided optionally operable means for accommodating lateral swinging of the tool-bar about its pivots or to prevent such lateral swinging by rendering the pivots of the parallel link connections substantially ineffective. As shown particularly well in Figs. 4 and 6, the parallel links 26 and 27 are rigidly connected by a pair of angularly arranged plates 42. These plates diverge rearwardly and each plate is provided with suitably vertically spaced openings adapted to register with openings in a plate member 43 and to be secured thereto by bolts 44. It will be noted that the plate member 43 is provided with several openings 45 to receive the bolt 44 and that the openings are provided in the plate member at a location adjacent one edge thereof. In Figs. 3, 4 and 6 the plate member 43 is so arranged that the rear edge thereof engages the forward edge of the tool-bar 30. This is the desired position when the tillage tool mounted upon the tool-bar is one such as the cane tool shown. As is shown in Fig. 6 in plan each end of the tool-bar 30 is engaged by a pair of spaced plate members 43 so that the parallel links 26 and 27 and the tool-bar 30 cannot swing laterally with respect to the draft frame 18.

Where the earth-working implement to be mounted upon the tool-bar 30 is a sub-soiler such as is shown in Figs. 1 and 2, it is desirable that the tool-bar and the sub-soiler 41 be permitted to swing laterally relative to the draft frame. When such an implement is attached to the tool-bar each of the plates 43 is removed and reversed from the position shown in Figs. 3, 4 and 6 to the position shown in Fig. 1 so that the edge of the plate 43 which engages the tool-bar in Fig. 4 extends forwardly in Fig. 1 and is not in a position to engage the tool-bar or the draft frame. It will be observed that the openings 45 in the plate 43 are staggered somewhat so that the position of the contacting edge of the plate member may be adjusted if desired, for example, to accommodate limited lateral movement of the tool-bar.

The operation of the implement attaching structure of this invention should be clearly understood from the foregoing description. It should likewise be understood that the invention has been described in its preferred form and that modifications may be made therein without departing from the spirit of the invention or the scope of the appended claims.

What is claimed is:

1. In an attaching structure for use in mounting earth-working tools upon a crawler type tractor, a rigid tool-bar extending across the path of the tractor at the rear thereof, a pair of draft arms connecting the tool-bar to the tractor, said draft arms extending longitudinally and being connected to opposite sides of the tractor between the front and rear thereof for vertical swinging movement on transverse axes, means for restraining lateral swinging of said arms, said means serving to guide the vertical movement thereof, a pair of longitudinally extending vertically spaced parallel links pivotally connecting each end of the tool-bar to the rear ends of said draft arms to accommodate lateral movement of the tool-bar relative to the draft arms, means rigidly connecting each pair of links, a rigid member carried by each pair of links and cooperable with the tool-bar to prevent lateral swinging of the links, and means for optionally adjusting the member to a position out of engagement with the tool-bar to accommodate lateral movement thereof.

2. In an attaching structure for use in mounting earth-working tools upon a crawler type tractor, a pair of longitudinally extending draft arms on opposite sides of the tractor, the forward end of each said arm being pivotally connected to the side of the tractor between the front and rear thereof for vertical swinging movement, means for restraining lateral movement of said arms, a rigid transverse tool-bar extending across the path of the tractor rearwardly thereof, and connecting means between the tool-bar and the rear ends of said draft arms accommodating lateral movement of the tool-bar relative to said arms comprising longitudinally extending laterally spaced link means connecting each end of the tool-bar to respective draft arms, and laterally spaced stop members carried by said link means adjustable to a position in locking engagement with opposite ends of the tool-bar to prevent pivoting of said links.

3. In an attaching structure for use in mounting earth-working tools upon a crawler type tractor, a pair of longitudinally extending draft arms on opposite sides of the tractor, the forward end of each said arm being pivotally connected to the side of the tractor between the front and rear thereof for vertical swinging movement about a transverse axis, a pair of vertically spaced parallel links pivotally connected to the rear end of each said arm and extending rearwardly therefrom, a transverse tool-carrying bar pivoted to the rear ends of said links for lateral swinging movement therewith relative to the draft arms, means accommodating vertical movement of said draft arms for confining the latter against lateral movement relative to the tractor, and optionally operable means for rendering the parallel links rigid with the draft arms comprising laterally spaced locking members adjacent the pivotal connections between said links and the tool bar, said locking members being adjustable to a locking position between the links and the tool bar to prevent relative pivoting therebetween.

4. In an attaching structure for use in mounting earth-working tools upon a tractor, a draft frame connected to the tractor to be raised and lowered relative thereto, a transverse tool-carrying bar at the rear of the tractor, means accommodating lateral movement of the tool-bar relative to the draft frame in response to turning of the tractor for connecting the tool-bar to the draft frame, said connecting means comprising vertically spaced pairs of parallel links, each pair being pivotally connected to one end of the tool-bar and extending forwardly therefrom, means connecting the forward ends of the links to the draft frame, and a pair of laterally spaced stop members carried by each pair of links and engageable with the tool-bar to render the pivotal connection thereof to the links ineffective, whereby lateral movement of the tool-bar is prevented.

5. In an attaching structure for use in mounting earth-working tools upon a tractor, a draft frame connected to the tractor to be raised and lowered relative thereto, a transverse tool-carrying bar at the rear of the tractor, means accommodating lateral movement of the tool-bar relative to the draft frame in response to turning of the tractor for connecting the tool-bar to the draft frame, said connecting means comprising vertically spaced pairs of parallel links, each pair being pivotally connected to one end of the tool-bar and extending forwardly thereupon, means connecting the forward ends of the links to the draft frame, and a pair of laterally spaced stop members carried by each pair of links and movable between positions in engagement with and spaced longitudinally from the tool-bar, whereby the tool-bar may be optionally allowed to move laterally relative to the draft frame or prevented therefrom.

6. In an attaching structure for use in mounting earth-working tools upon a tractor, a draft frame connected to the tractor to be raised and lowered relative thereto, a transverse tool-carrying bar at the rear of the tractor, means accommodating lateral movement of the tool-bar relative to the draft frame in response to turning of the tractor for connecting the tool-bar to the draft frame, said connecting means comprising vertically spaced pairs of parallel links, each pair being pivotally connected to one end of the tool-bar and extending forwardly thereupon, means connecting the forward ends of the links to the draft frame, a pair of vertically extending members rigidly connecting each pair of links between the pivots thereof, and a reversible plate serving as an adjustable stop member removably secured to each said member and adjustable to and from a position in engagement with the tool-bar to hold the parallel links and therefore the tool-bar against lateral movement relative to the draft frame.

LEE H. KAUPKE.

References Cited in the file of this patent

UNITED STATES PATENTS

| Number | Name | Date |
|---|---|---|
| 696,808 | Gatling | Apr. 1, 1902 |
| 1,960,269 | Lindgren | May 29, 1934 |
| 2,140,712 | Mitchell | Dec. 20, 1938 |
| 2,379,225 | Fraga | June 26, 1945 |